United States Patent [19]

Imhof et al.

[11] Patent Number: 4,755,441

[45] Date of Patent: Jul. 5, 1988

[54] FIBER STRUCTURE-ELECTRODE FRAMEWORK OF METALLIZED SYNTHETIC RESINOUS FIBERS, WITH REINFORCED EDGE AND WELDED-ON CURRENT-CONDUCTING LUG

[75] Inventors: Otwin Imhof, Nuertingen; Claus Schneider, Fellbach; Willi Kitzhoefer, Petersborn, all of Fed. Rep. of Germany

[73] Assignee: Deutsche Automobilgesellschaft mbH, Hannover, Fed. Rep. of Germany

[21] Appl. No.: 100,365

[22] Filed: Sep. 23, 1987

[30] Foreign Application Priority Data

Sep. 24, 1986 [DE] Fed. Rep. of Germany ....... 3632351

[51] Int. Cl.⁴ .................................... H01M 2/26
[52] U.S. Cl. .................................. 429/211; 429/235
[58] Field of Search ............... 429/211, 235, 161, 236, 429/237

[56] References Cited

U.S. PATENT DOCUMENTS

| | | | |
|---|---|---|---|
| 2,861,115 | 11/1958 | Berg | 429/237 |
| 3,607,432 | 9/1971 | Johnson | 429/211 |
| 4,439,281 | 3/1984 | Schneider et al. | 429/211 |
| 4,687,719 | 8/1987 | Benda et al. | 429/235 |

Primary Examiner—Donald L. Walton
Attorney, Agent, or Firm—Barnes & Thornburg

[57] ABSTRACT

A fiber structure-electrode framework of metallized plastic fibers with reinforced edge and with welded-on current-conducting lug, in which the current-conducting lug is provided with one or several steps on the side abutting at the fiber framework. The electrode framework is so connected with the current-conducting lug that the reinforced edge of the electrode framework is located inside of an area whose boundaries lie at the distance of double the lug thickness on both sides of the step. The fiber structure-electrode framework which is compressed in the stepped area reaches its full thickness continuously approximately to the end of the step.

4 Claims, 1 Drawing Sheet

FIBER STRUCTURE-ELECTRODE FRAMEWORK OF METALLIZED SYNTHETIC RESINOUS FIBERS, WITH REINFORCED EDGE AND WELDED-ON CURRENT-CONDUCTING LUG

BACKGROUND AND SUMMARY OF THE INVENTION

The present invention relates to a fiber structure electrode framework of metallized plastic fibers with reinforced edge and welded-on, current-conducting lug.

For connecting fiber structure electrode frameworks of metallized plastic fibers, for example, of nickel-plated polyolefin-felt or -fleece material, it is known to slot the edge of the electrode framework, to insert into the slot the current-conducting lug and then to weld together the electrode framework with the current lug. However, such a possibility is very expensive and realizable only with small quantities.

For connecting current-conducting lugs with fiber structure-electrode frameworks, it is also known to weld together the edge of the electrode framework reinforced by a galvanically deposited metal layer with the current-conducting lug (DE-PS No. 31 42 091). As the fiber structure electrodes have a high capacity in relation to surface with simultaneous very high current load, the current lug must be selected relatively thick for reasons of electric conducting ability (about 1 to 1.5 mm.). The welding together of the current lug with the edge of the fiber structure-electrode framework takes place by resistance welding. For that purpose the fiber structure-electrode framework is placed on the current lug and is welded together with the same under pressure. Disadvantageous with this type of connection is the fact that the bottom edge of the current lug is pressed into the nickel-plated framework and may lead thereat to cracking in the fiber framework. Additionally, the supporting cross section of the framework is strongly reduced at this place. This leads to a low strength of the welded connection so that during the following operating steps for manufacturing the electrode (installation of the active mass, welding together into plate sets) high reject numbers result owing to breaking off current-conducting lugs. Additionally, during the operation of such cells, particularly with traction utilization, individual plates may break off from the lugs, owing to the mechanical stresses and may lead therewith to failures.

The present invention is therefore concerned with the task to find a fiber structure-electrode framework of metallized plastic fibers with welded-on current-conducting lug, in which no crack formation can occur in the fiber structure-electrode framework in proximity of the welded connection, in which the cross section of the fiber structure-electrode framework is not excessively constricted outside of the reinforced edge and in which the welded connection exhibits a high strength not only when subjected to tensional loads but also in the cross direction and thus enables the manufacture of electrodes with favorable electrical transfer resistances and long service life so that the same can also be utilized in traction batteries.

The underlying problems are solved according to the present invention in that the fiber structure-electrode framework has a thickness of 1 to 10 mm., in that the current-conducting lug is provided with one or several steps along the side abutting at the fiber framework whose height corresponds altogether to 0.3 to 0.8 times the current-conducting lug thickness and whose depth amounts altogether to 3 to 10 mm., in that the edge of the fiber structure-electrode framework is located within an area on the current-conducting lug whose boundaries are located at a distance of twice the current-conducting lug thickness on both sides of the step edge and in that the fiber structure-electrode framework compressed within the stepped area reaches its full thickness approximately continuously up to the end of the step.

The current-conducting lug is provided with one or several steps at the side abutting at the fiber framework whose height corresponds altogether to 0.3 to 0.8 times the lug thickness and whose depth amounts altogether to 3 to 10 mm.

The edge of the fiber structure-electrode framework which is to have a thickness between 1 and 10 mm. may be located inside an area of the current-conducting lug whose boundaries are located at a distance twice the lug thickness on both sides of the step edge. It is preferred when this distance corresponds approximately to the thickness of the current-conducting lug and the fiber framework comes to lie on the stepped-off part of the current-conducting lug. If the fiber framework is located too far from the step, then an excessively high voltage loss will result after the welding operation on the now excessively long unwelded part of the stepped lug. If the fiber framework lies too far on the non-stepped part of the current-conducting lug, then the effect by the step is lost. During the contact pressure of the welding electrodes, the maximum pressures occur in the zone of the reinforced edge of the fiber framework and the welded connection takes place in the preferred embodiment in the first instance in the stepped area of the current-conducting lug. The height of the step is to correspond to 0.3 to 0.8 times the current-conducting lug thickness. It is also possible to distribute this height over several steps so that excessively abrupt cross-sectional changes are avoided. The depth of the steps is to amount altogether to 3 to 10 mm.

By an appropriate form of the welding electrode abutting on the fiber side, it is achieved that the fiber structure-electrode framework compressed in the stepped area attains the full thickness up to the end of the step in an approximately continuous manner. As a result thereof, it is achieved in combination with the stepped current lug that the electrode framework is not excessively constricted at the end of the current lug and therewith cracks in the fiber framework are avoided at this place. This leads to an improved mechanical stability of the welded connection. It is additionally advantageous for avoiding fiber cracks to round-off the step edge.

Metallized plastic fiber frameworks, especially felts, needle felts, fleeces and the like are used as electrode frameworks. The metallization takes place according to the customary techniques whereby especially nickel or copper is used as metallic coating on the fibers. The plastic materials suitable also for textile fibers can be used as material for the fibers of the present invention, for example, polyolefins, polyamides, polyacrylnitriles, etc. insofar as they are stable with respect to the electrolytes with which they are to come in contact later on.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
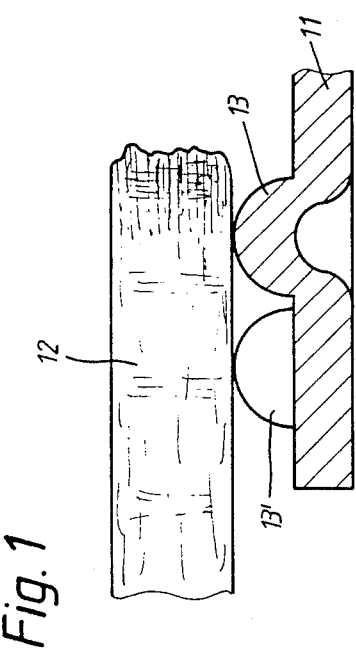
FIG. 1 is a somewhat schematic partial longitudinal cross-sectional view through a heretofore customary connection of a nickel-plated current lug with a fiber structure-electrode framework prior to the welding operation.
Figure 2:
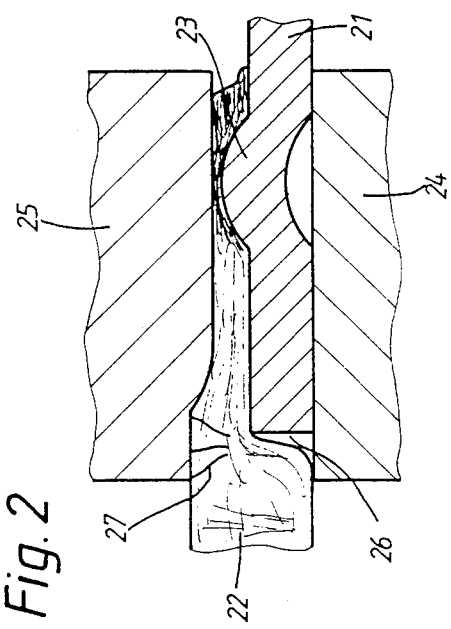
FIG. 2 illustrates the framework according to FIG. 1 after the welding operation.

Referring now to the drawing wherein like reference numerals are used throughout the various views to designate like parts, FIG. 1 illustrates the current-conducting lug 11 which is provided with two embossed hump rows 13 and 13'. The end of the fiber structure-electrode framework 12 is placed on the hump rows 13 and 13'. The welding electrodes 24 and 25 can be seen in FIG. 2, between which the current-conducting lug 21 and the fiber structure-electrode framework 22 are located. Owing to the high abutment pressure of the welding electrodes 24 and 25, the hump 13 according to FIG. 1 has been deformed to the more flat hump 23. It can be further seen from FIG. 2 that the fiber structure is strongly compressed by the welding electrode 25 over a larger distance. At the end 26 of the current-conducting lug 11, there takes place a practically transition-less cross-sectional change which may lead to cracks 27. After the removal of the welding electrodes 25 and 24, the illustrated shape of the current-conducting lug 21 and of the fiber structure-electrode framework 22 remains essentially preserved.

Figure 3:
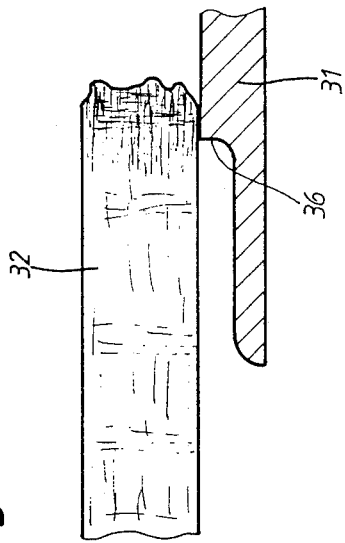
FIG. 3 is a somewhat schematic partial longitudinal cross-sectional view through a fiber structure-electrode framework with a stepped current-conducting lug in accordance with the the present invention prior to welding.

FIG. 3 illustrates again a current-conducting lug 31 as well as the fiber structure-electrode framework 32. The current-conducting lug 31 is provided with a step 36 whose height in the illustrated case corresponds approximately to 0.5 times the lug thickness. The fiber structure-electrode framework 32 protrudes beyond the step toward the current-conducting lug by a distance that corresponds approximately to the thickness of the lug 31. The depth of the step 36 amounts approximately to 3 to 10 mm.

Figure 4:
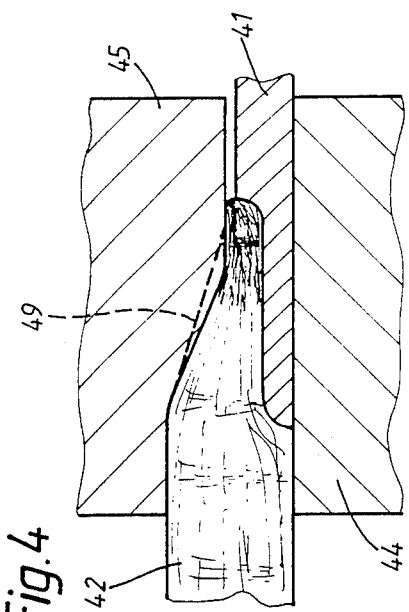
FIG. 4 is illustrates the fiber structure-electrode framework according to FIG. 3 after the welding operation.

FIG. 4 illustrates the current-conducting lug 41 and the fiber structure framework 42 during the welding operation, pressed-in between the upper welding electrode 45 and the lower welding electrode 44. The fiber structure framework 42 is so positioned in this construction on the current-conducting lug 41 that the welding operation takes place essentially on the stepped part of the current-conducting lug 41. With an overlap of the fiber framework and the non-stepped current-conducting lug the welding zone may extend into the area of the non-stepped part of the current-conducting lug. The upper welding electrode 45 is so constructed that the fiber structure-electrode framework compressed within the stepped area attains approximately continuously its full thickness up to the end of the step. In the drawing, this transition is achieved by a slightly curved shape of the upper electrode 45. However, it is also possible to permit the transition to proceed continuously as shown, for example, by the dash line 49. Such an electrode 45 with continuous transition can be made more easily from a manufacturing point of view and can be refinished more simply in case of wear. The current-conducting lug, in lieu of being provided with a single step, may also be provided with several steps; however, for reasons of appropriateness, one will not use generally more than three steps.

Compared to a prior art fiber structure-electrode framework with welded-on current-conducting lug, the strength of the connection in the transition area increases by more than 30% in the fiber structure-electrode framework according to the present invention in which the current-conducting lug has one or several steps. The reject numbers also decrease therewith and such a fiber structure-electrode is then utilizable not only in stationary applications, but also in traction batteries without any danger. As a result of the smaller constriction of the nickel-plated fibers in the transition from framework into the current-conducting lug, the stress peaks are also smaller thereat and the high current loadability of the cells will be improved thereby.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fiber structure-electrode framework of metallized plastic fibers with reinforced edge and welded-on current-conducting lug means, in which the fiber structure-electrode framework has a thickness of about 1 to about 10 mm., the current-conducting lug means being provided with at least one step on the side abutting at the fiber framework whose height corresponds altogether to about 0.3 to 0.8 times the lug thickness and whose depth amounts altogether to about 3 to 10 mm., the edge of the fiber structure-electrode framework being located within an area on the current-conducting lug means whose limits lie at a distance of about twice the lug thickness on both sides of the step edge, and the fiber structure-electrode framework which is compressed within the stepped area, attaining its full thickness approximately continuously up to the end of the step.

2. A fiber structure-electrode framework according to claim 1, wherein the edge of the step is rounded-off.

3. A fiber structure-electrode framework according to claim 1, wherein several steps are provided.

4. A fiber structure-electrode framework according to claim 3, wherein the edge of the step is rounded-off.

* * * * *